Jan. 23, 1934.  W. E. DÖRR  1,944,682
TRANSMISSION GEARING
Filed Oct. 24, 1930
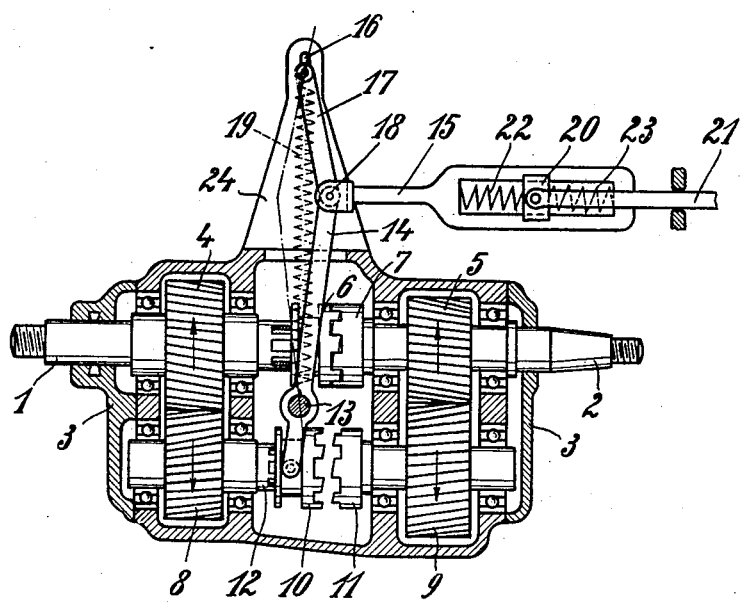
Inventor:
Wilhelm E. Dörr.

Patented Jan. 23, 1934

1,944,682

UNITED STATES PATENT OFFICE 1,944,682

TRANSMISSION GEARING

Wilhelm E. Dörr, Überlingen, Germany, assignor to Maybach-Motorenbau G. m. b. H., Friedrichshafen, Germany Application October 24, 1930, Serial No. 490,889, and in Germany November 6, 1929

2 Claims. (Cl. 74—59)

My invention relates to transmission gearing and has special reference to two speed change speed gears with two pairs of constantly meshing wheels. Such two speed gears may be used as sole transmitting means or they may be added to other gearings or even combined with them and housed in one gear box.

The main object of my invention is an easy change in speed while the transmission is under load in automobiles for example without declutching the main friction clutch between the motor and the transmission.

Another object is a very compact construction of the device and mainly reduction in the length of the gear box as compared with other constructions.

A further object is the possibility of journaling the transmitting gears on both their sides so as to warrant their smooth and quiet running.

According to my invention the two pairs of intermeshing gears are so situated with relation to each other that always two of them are co-axial; besides there are clutches provided between each two co-axial gears and both clutches are so operated that engagement of one of them means disengagement of the other one and vice-versa.

The drawing represents an example embodying my invention. It is a longitudinal vertical section through a two-speed gear according to my invention.

Fixed to driven shaft 1 is gear 4; gear 8 is in constant mesh therewith. Co-axial with gear 4 is gear 5 fixed to driven shaft 2; and co-axial to gear 8 gear 9 is situated which is in constant mesh with gear 5. Splined to the inner end of shaft 1 is coupling half 6 which co-operates with coupling half 7 fixed to shaft 2 and gear 5. Coupling half 10 is splined to shaft 12 to which gear 8 is fixed, and co-operating therewith is coupling half 11 formed integral with gear 9. Lever 14 journaled at 13 by means of forks or the like fitting into the circular grooves provided in coupling halves 6 and 10, respectively, is adapted to shift these halves on their respective shafts. And as the fulcrum 13 is situated between these shafts the coupling halves will always move in opposite directions.

Journaled in the upper end of lever 14 there is a rod 15 having a longitudinal slit at its right hand end. Between two springs 22 and 23 a member 20 is provided adapted to slide in the slit of rod 15; and connected to this member is rod 21 by means of which the whole device can be operated. Another rod 17 also journaled at 18 in the upper end of lever 14 extends upward and with its upper end slides in slit 16 of bracket 24 supported by the casing 3. Spring 19 at its upper end being fastened to the upper end of rod 17 and with its lower end to shaft 13 or some other fixed point of the casing tends to hold the clutch shifting device in one or the other of its two positions, thus avoiding an idling middle position. Springs 22 and 23 allow for setting operating rod 21 independently of the movement of lever 14, because as long as the two halves of coupling 6/7 or 10/11 are under load they will not separate. Disengagement of one coupling and resilient contact between the halves of the other coupling is caused by the driver taking the gas off the motor.

The front faces of the teeth of these couplings are so inclined that the teeth do not engage when they first meet, but the coupling halves coming into touch will repulse each other until the half which originally was rotating faster than the other one has slowed down and just begins to become the slower one, or the originally slower one may catch up and begins to over-run the originally faster one. In one or the other of these cases the final engagement between the two corresponding coupling halves will occur just a moment after both halves have come to equal speed of rotation.

The operation of the gearing according to my invention and as exemplified in the drawing is as follows:

Assuming the position as represented on the drawing, which is direct drive from shaft 1 through claw coupling 6/7 to shaft 2, both shafts rotating at equal speed, and it be desired to change into the other possible speed: the driver has to push rod 21 to the left by any well-known means, for example a lever or the like (not represented), thereby compressing spring 22 but without causing movement of rod 15 and lever 14. These elements do not move because coupling halves 6/7 are under load. Then, in the moment when the speed change is desired, the driver takes the gas off the motor and thereby for a short time unloads the coupling so that now the pressure of compressed spring 22 pushes rod 15 to the left and causes lever 14 in its upper part to move to the left also. This means disengagement of coupling 6/7 and furthermore sliding of lower coupling half 10 to the right until it comes into contact with coupling half 11. Spring 19 tends to bring these halves 10 and 11 into final engagement but because of the inclination of the teeth and because gear 8 running faster than gear 9 at the moment when both halves meet this final engagement is prevented as long as gear 8 is rotating faster than gear 9. The motor which drives shaft 1, gear 4 and gear 8 will slow down because of the gas being taken off. The car having a comparatively great momentum will roll on, so that after a certain time period gear 8 is due to slow down to a speed of rotation lower than that of gear 9 driven by the on-rolling car. When this is reached the force of spring 19 causes final engagement of coupling halves 10 and 11, so that lever 14 and rod 17 get into the position indicated by dotted lines (centre lines of the members). This final engagement of coupling 10/11 means that now shaft 2 is driven by shaft 1 by means of gears 4 and 8, through coupling 10/11 and through gears 9 and 5. Consequently, because of the gear diameters chosen, shaft 2 will now be rotating at higher speed than shaft 1. The second speed is set and the driver may give gas again.

Changing back again to the first speed means that rod 21 has to be pulled back to its right hand position thereby compressing spring 23. Again nothing will happen until the driver takes the gas off and unloads coupling 10/11. This now separates and coupling halves 6 and 7 are resiliently pressed against each other by means of spring 19. But gear 5 rotating faster than gear 4 final engagement is prevented by the bevelled faces of the coupling teeth until gear 4 catches up in speed of rotation by the driver giving gas again. As soon as gear 4 begins to overrun gear 5 the tension of spring 19 causes final engagement between the two coupling halves 6 and 7 so that now direct drive from shaft 1 to shaft 2 is in operation again.

Of course, it is not essential to use the double-armed lever 14, as equivalents thereof will readily be apparent to those skilled in the art.

Furthermore instead of connecting driven shaft 2 to gear 5, it may be connected to gear 9. This latter construction renders it possible to make use of another transmission ratio instead of the direct drive.

I do not want to be limited to the details described or shown in the drawing, as many variations will occur to those skilled in the art.

What I claim is:

1. In a transmission gearing, a pair of coaxial gears of different size, a second pair of coaxial gears meshing with the first pair of gears, a pair of relatively movable claw clutch members between the two gears of each such pair having the front faces of their teeth sloped in such a direction that if either of said clutches is disconnected while the gears are rotating in their normal direction, and the other clutch members are immediately tensioned towards engagement, such second pair of clutch members will over-run without engagement until the relative speed of the respective gears has been changed to bring the halves of such second pair of clutch members to substantially equal speed, means interconnecting said clutches such that as one of said pairs is caused to engage, the other pair is caused to disengage, and impositive means operatively connected with said interconnecting means whereby either of said pairs of clutches may be tensioned yieldingly towards engagement after the other pair has been caused to disengage.

2. In a transmission gearing, a pair of coaxial gears of different size, a second pair of coaxial gears also of different relative size meshing with the first pair, with the smaller gear of each such pair arranged to mesh with the larger gear of the other such pair, a pair of relatively movable claw coupling members between the two gears of each such pair having the front faces of their teeth so shaped that if the members of either of such claw couplings are brought into contact when the gears are rotating in their normal direction, the coupling will over-run and not engage if the smaller gear of such pair is rotating more rapidly than the corresponding larger gear, means whereby when one such pair of couplings is moved to contact, the other pair is caused to disengage and impositive means operatively connected with said first-mentioned means for operating said couplings, whereby either pair of couplings may be tensioned to disengage and at the same time the other pair is tensioned yieldingly towards engagement.

WILHELM E. DÖRR.